Nov. 12, 1957 P. V. SARLUND 2,812,957

PUNCH CARD FOR DISTRIBUTING CODING INFORMATION

Filed April 19, 1954

PENTTI V. SARLUND
*INVENTOR.*

BY Francis W. Crotty

HIS ATTORNEY.

Patented Nov. 12, 1957

2,812,957

PUNCH CARD FOR DISTRIBUTING CODING INFORMATION

Pentti V. Sarlund, Chicago, Ill., assignor to Zenith Radio Corporation, a corporation of Illinois Application April 19, 1954, Serial No. 424,208

2 Claims. (Cl. 283—6)

This invention relates in general to punch cards and more particularly to such cards that are useful for distributing information pertaining to the code schedule employed in a subscription communication system.

Several subscription television systems have been proposed wherein the television signal is coded in accordance with a selected coding schedule at the transmitter, and a key or coding signal representing or indicating the coding schedule of the telecast is transmitted to the subscriber receivers as a modulation component of the coded television signal itself or over any other suitable ether channel. Systems of this general type are disclosed and claimed, for example, in copending applications Serial No. 281,418, filed April 9, 1952, in the name of George V. Morris et al.; Serial No. 310,309, filed September 18, 1952, in the name of Alexander Ellett; Serial No. 326,107, filed December 15, 1952, in the name of Jack E. Bridges; and Serial No. 370,174, filed July 24, 1953, in the name of Walter S. Druz, all of which are assigned to the present assignee.

When such an air-borne coding signal is utilized it is usually desirable to employ some mechanism at each receiver which alters or transposes the received coding signal in accordance with a predetermined pattern, known only to authorized subscriber, before it is used for decoding purposes in order to eliminate any unauthorized appropriation of the subscription telecast. This may be accomplished by utilizing a suitable switching mechanism, the setting thereof determining the exact manner in which the coding signal is used to actuate the encoding apparatus. Unless the precise switch adjustment is known, proper decoding is impossible. This switch setting information may be conveyed to a subscriber from the subscription television exchange, for example, verbally over a telephone link or by mail, a suitable charge being assessed for such information. It is contemplated that when subscription television is employed on a wide commercial scale in any given geographical area, it will be more economical and expedient to distribute via the mails a number of different switch settings at one time displayed on a card, a different setting for each subscription program interval. This would have the obvious advantage of minimizing the expenses incurred and time involved on the part of the subscription television operating company as well as the subscriber.

However, when a subscriber has purchased a card that may display enough individual code combinations to decode all of the subscription programs for a predetermined period, such as a week or a month, there will be times, of course, when the subscriber does not actually view all of the programs broadcast and consequently should receive a rebate or credit for such programs. In order to determine exactly which programs have been viewed by the subscriber, the present invention contemplates the the various program code or switch combinations be hidden from view by means of a novel punch card arrangement. The subscriber would have to remove the "punch" bearing the code information for each program which he desired to view. The punch cards may be sent back to the subscription exchange at the end of the period, be it a week, month etc., and the card may then be examined either manually or by the use of automatic equipment for scanning the "punches," and a credit may be given to the subscriber on the basis of the particular "punches" not removed or punched out from the card. In accordance with the present invention, this punch card is constructed in such a manner that if a person bent on fraud attempts to extract surreptitiously the code information from any one of the "punches," an irreparable telltale injury results to the particular "punch" involved.

It is, accordingly, an object of the present invention to provide a relatively simple punch card for distributing code information in a subscription communication system which reveals a telltale indication whenever a "punch" is removed, so that fraudulent appropriation of the decoding information is substantially precluded.

It is another object of the invention to provide a punch card for use in a subscription television system which may conveniently be examined for billing purposes to determine the particular subscription programs view by a subscriber.

A punch card for distributing information pertaining to the code schedule employed in the subscription broadcasting of radio or television programs and containing a plurality of code messages each bearing code schedule information with respect to a particular program interval, constructed in accordance with the invention, comprises a continuous relatively stiff first lamination having a predetermined thickness and provided with a series of incisions which define a plurality of removable portions integrally related to the first lamination. Each portion has predetermined boundaries and is individually assigned to one of the program intervals, and the portions are spaced from one another in a predetermined pattern. The punch card has a second relatively stiff lamination provided with a corresponding plurality of punch guides individually smaller than the individual removable portions of the first lamination and collectively arranged in the same predetermined pattern. The first and second laminations are in mutual juxtaposition and are secured to each other, at points other than points lying within the removable portions, with the punch guides of the second lamination in respective alignment with the removable portions of the first lamination. The code messages are confined between the removable portions and the second lamination and thus are withheld from view until after removal of the portions. Finally, the punch card comprises a third lamination which has a thickness relatively thin compared to that of the first lamination and is secured to the first lamination on the opposite side from the second lamination. Uninterrupted sections of the third lamination cover a major part of the boundaries of the removable portions. The removable portions are adapted to break through the uninterrupted sections thereby inflicting irreparable and obvious telltale injury upon the third lamination.

The features of this invention which are believed to be new are set forth with particularity in the appended claims. The invention together with further objects and advantages thereof, may best be understood, however, by reference to the following description when taken in conjunction with the accompanying drawings, in which:

Figure 1:
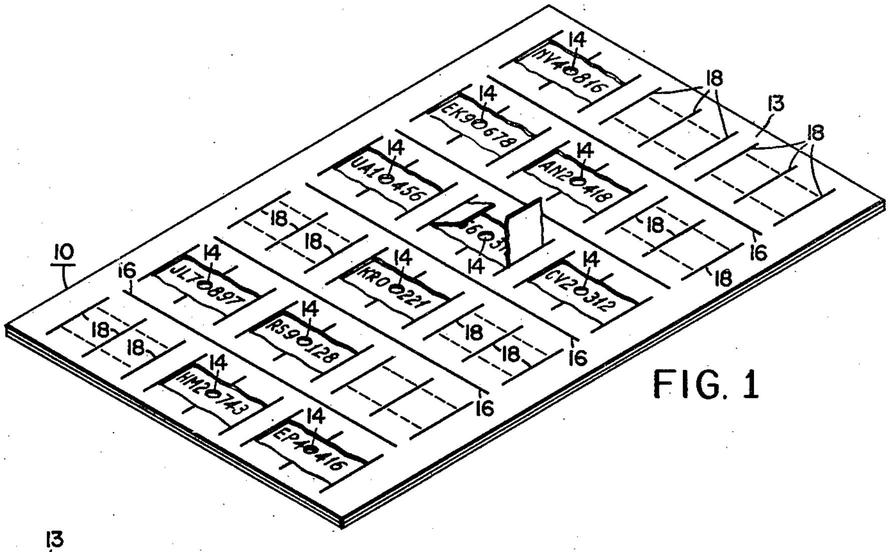
Figure 1 is an isometric view of a punch card constructed in accordance with one embodiment of the invention.
Figure 2:
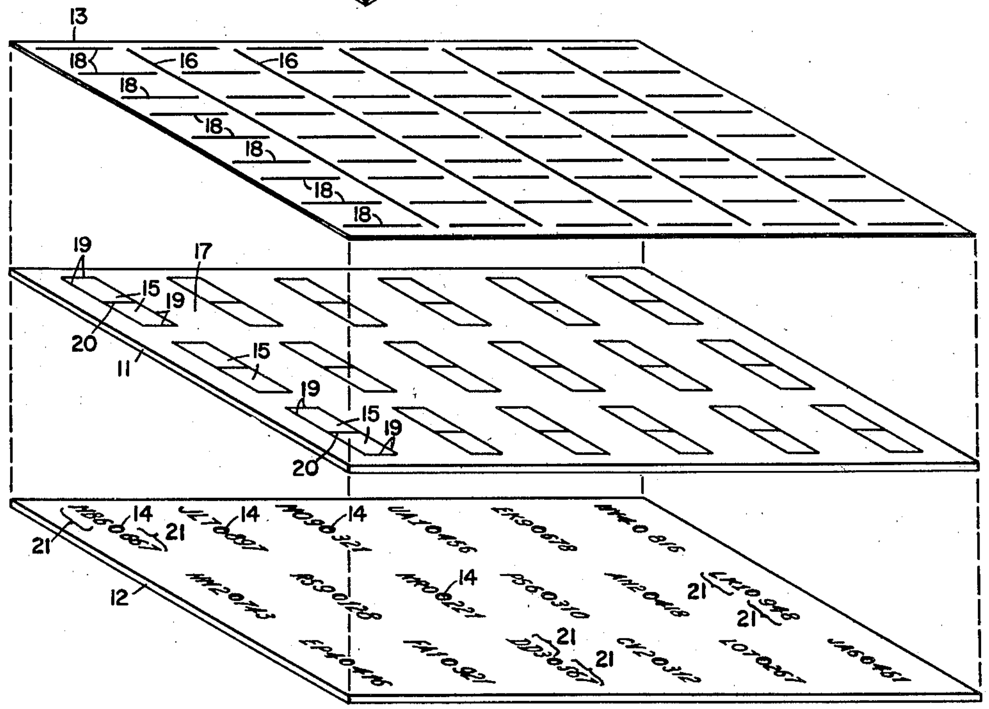
Figure 2 is an exploded, isometric view of the punch card of Figure 1.

Specifically, the punch card 10 of Figures 1 and 2 comprises a continuous relatively stiff first lamination 11, which may be of thin cardboard or the like, having a plurality of removable areas individually assigned to one of the subscription programs and spaced from one another in a predetermined pattern. These removable areas are indicated in the drawings as portions 15 (see particularly Figure 2) and are formed by means of a series of partial or complete incisions or perforated lines 19. As shown, each removable area 15 is divided or bisected into two equal parts by a perforated line 20 to facilitate convenient removal from the punch card, as will be made apparent hereinafter; however, these removable areas may take any desired form or shape.

Punch card 10 also comprises a second relatively stiff lamination 12 of thin cardboard or the like having a plurality of punch guides 14 corresponding to the number of removable areas 15 of lamination 11. These guides are individually smaller than the removable areas and are collectively arranged in the same predetermined pattern, laminations 11 and 12 being in mutual juxtaposition (held together at points other than points lying within removable areas or portions 15, for example, by means of a suitable cement not applied to removable areas 15) with punch guides 14 of second lamination 12 in respective alignment with removable areas 15 of first lamination 11. Preferably, these punch guides take the form of holes 14, as shown, in order that a subscriber may conveniently remove one of the "punches," namely one of the removable areas 15, merely by inserting some object such as a pencil through the hole in the direction from lamination 12 to lamination 11. Moreover, it is also preferable to provide holes 14 with a diameter of such a magnitude that when a conventionally sharpened pencil is inserted into a hole 14 in order to push or punch out one of the removable portions 15, the pencil is arrested by lamination 12 after it has progressed a predetermined distance. This feature has the advantage of minimizing any damage to the code information contained in the punch card if a subscriber inadvertently punches out an area too vigorously.

As illustrated, each punch guide hole 14 of second lamination 12 is in respective alignment with an assigned one of the removable areas 15 and its bisecting incision 20 for convenience in punching out the areas. However, each punch guide may be arranged to coincide with any portion of the removable areas.

Indicia 21 indicative of the code schedule information are confined between the removable portions 15 and second lamination 12 and are withheld from view until after removal of areas 15. Preferably, this information appears on the internal surface of second lamination 12, which is immediately adjacent first lamination 11, and is confined within the removable areas 15 so that once these areas are punched out, the code combinations are revealed as shown in Figure 1.

Punch card 10 also comprises a third lamination 13 having a thickness relatively thin compared to that of the first lamination, in juxtaposition with first lamination 11 on the opposite side from second lamination 12, which is subject to irreparable and obvious telltale injury upon removal of any of the portions 15 from lamination 11 in order to prevent fraudulent extraction of the code schedule information. Lamination 13 preferably is constructed of some fibrous paper material, such as a tissue paper of a distinctive color different from that of the first lamination, cemented to layer 11 which, when torn, leaves a ragged edge. This represents a salient feature of the present invention since by the incorporation of lamination 13 in punch card 10, it is impossible for a person to remove the areas 15, ascertain the coding information, and then attempt to replace the removable areas without injuring lamination 13 in a discernable manner. Lamination 13, instead of taking the form of a layer of fibrous material, may, for example, take the form of a thin layer of plastic or lacquer which is sprayed directly over lamination 11. The important aspect of lamination 13 is that by removing one of areas 15 either by punching it out in conventional manner or by fraudulently attempting to remove it with painstaking care, a ragged telltale outline results in layer 13.

In order to limit the extent of tearing of lamination 13 when any one of areas 15 is punched out so that the ragged outline remaining does not extend into an adjacent one of areas 15, partial or complete incisions 16 may be provided in lamination 13 in juxtaposition with fixed areas 17 of first lamination 11. Other partial or complete incisions 18 may also be provided in third lamination 13 in juxtaposition or in registration with some of the incisions defining the removable portions 15 of first lamination 11; however, to insure telltale injury to third lamination 13 whenever a "punch" is made and one of areas 15 is removed, at least some part of the boundaries of each removable area 15 must be bridged by an uninterrupted portion of third lamination 13. These incisions in a sense serve as "fences" to confine the torn edges of the punched out areas within prescribed boundaries or limits.

Figure 3:
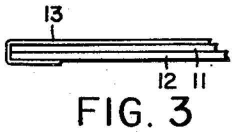
Figure 3 is a fragmentary end view showing a portion of a punch card constructed in accordance with another embodiment of the invention.

In accordance with the embodiment shown in Figure 3, the dimensions of third lamination 13 are made larger than that of laminations 11 and 12 and the excess area is folded over and around layers 11 and 12 and anchored or cemented to the external surface of layer 12, as shown. By incorporating this feature into punch card 10, any attempt to separate the layers from one another, as for example, by use of a razor blade, in order to read the code information results in a telltale mark or indication along the outside edges of the punch card. The results achieved by the arrangement shown in Figure 3 may also be obtained by crimping a metal strip around the edges of card 10, by binding the edges with paper or cloth tape, or by sewing through the card around the edges.

The invention provides, therefore, a punch card for displaying confidential code information for use in a subscription television system which is extremely simple in construction, facilitates economical and convenient assessment of subscription charges, and yet which reveals a telltale indication whenever a "punch" is removed, thus precluding fraudulent extraction of the decoding information.

While particular embodiments of the invention have been shown and described, modifications may be made, and it is intended in the appended claims to cover all such modifications as fall within the true spirit and scope of the invention.

I claim:

1. A punch card for distributing information pertaining to the code schedule employed in the subscription broadcasting of radio or television programs and containing a plurality of code messages each bearing code schedule information with respect to a particular program interval, said punch card comprising: a continuous relatively stiff first lamination having a predetermined thickness and provided with a series of incision defining a plurality of removable portions integrally related to said first lamination and each having predetermined boundaries and individually assigned to one of said program intervals, said portions being spaced from one another in a predetermined pattern; a second relatively stiff lamination provided with a corresponding plurality of punch guides individually smaller than the individual removable portions of said first lamination and collectively arranged in the same predetermined pattern, said first and second laminations being in mutual juxtaposition and secured to each other at points other than points lying within said removable portions with the punch guides of said second lamination in respective alignment with the removable portions of said first lamination, said code messages being confined between said removable portions and said second lamination and thus withheld from view until after removal of said portions; and a third lamination having a thickness relatively thin compared to that of said first lamination and secured to said first lamination on the opposite side from said second lamination, uninterrupted sections of said third lamination covering a major part of the boundaries of each of said removable portions and said removable portions being adapted to break through said uninterrupted sections thereby to inflict irreparable obvious telltale injury upon said third lamination.

2. A punch card for distributing information pertaining to the code schedule employed in the subscription broadcasting of radio or television programs and containing a plurality of code messages each bearing code schedule information with respect to a particular program interval, said punch card comprising: a continuous relatively stiff first lamination having a predetermined thickness and provided with a series of incisions defining a plurality of removable portions integrally related to said first lamination and each having predetermined boundaries and individually assigned to one of said program intervals, said portions being spaced from one another in a predetermined pattern, some of the incisions individually bisecting assigned one of said removable portions; a second relatively stiff lamination provided with a corresponding plurality of punch guide holes individually smaller than the individual removable portions of said first lamination and collectively arranged in the same predetermined pattern, said first and second laminations being in mutual juxtaposition and secured to each other at points other than points lying within said removable portions with each punch guide hole of said second lamination in respective alignment with an assigned one of said removable portions and its bisecting incision, said code messages being confined between said removable portions and said second lamination and thus withheld from view until after removal of said portions; and a third lamination having a thickness relatively thin compared to that of said first lamination and secured to said first lamination on the opposite side from said second lamination, uninterrupted sections of said third lamination covering a major part of the boundaries of each of said removable portions and said removable portions being adapted to break through said uninterrupted sections thereby to inflict irreparable obvious telltale injury upon said third lamination.

References Cited in the file of this patent

UNITED STATES PATENTS

| | | |
|---|---|---|
| 975,887 | Newton | Nov. 15, 1910 |
| 1,714,127 | Graham | May 21, 1929 |
| 2,006,620 | Barrett et al. | July 2, 1935 |
| 2,095,111 | Trilolo | Oct. 5, 1937 |
| 2,440,062 | Allen | Apr. 20, 1948 |